United States Patent [19]

Zhao et al.

[11] Patent Number: 5,286,692
[45] Date of Patent: Feb. 15, 1994

[54] MILD HYDROCRACKING CATLYST AND THE PROCESS THEREFOR

[75] Inventors: Yan Zhao; Yuduo Hou; Quanzhu Peng; Jiduan Liu; Xiaogang Chen, all of Fushun, China

[73] Assignee: China Petro-Chemical Corporation, Beijing, China

[21] Appl. No.: 973,555

[22] Filed: Nov. 9, 1992

Related U.S. Application Data

[63] Continuation of Ser. No. 670,050, Mar. 15, 1991, abandoned.

[30] Foreign Application Priority Data

Mar. 17, 1990 [CN] China .............................. 90101355-2

[51] Int. Cl.$^5$ .............................................. B01J 29/08
[52] U.S. Cl. ...................................... 502/65; 208/111
[58] Field of Search ........................... 502/65; 208/111

[56] References Cited

U.S. PATENT DOCUMENTS

| | | | |
|---|---|---|---|
| 4,259,212 | 3/1981 | Gladrow et al. | 502/65 |
| 4,584,287 | 4/1986 | Ward | 502/65 |
| 4,632,749 | 12/1986 | Hilfman | 502/65 |
| 4,894,142 | 1/1990 | Steigleder | 502/65 |

Primary Examiner—Carl F. Dees
Attorney, Agent, or Firm—Ladas & Parry

[57] ABSTRACT

A mild hydrocracking catalyst contains amorphous matrix, zeolite, at least one metal compound selected from Group VIB and at least one metal compound selected from Group VIII. The catalyst is characterized in that the incorporated REUHP zeolite has dual pore distribution at <20 Å and around 200 Å and 3-10 percent by weight lanthanum, cerium, or mixed rare earth oxide. The amorphous matrix is $\gamma$-Al$_2$O$_3$ in which 80% total pore volume is contributed by pores having a diameter larger than 50 Å and 60% total pore volume is contributed by pores having a diameter in the range of 50-100 Å. A phosphorus promoter may be incorporated into the catalyst of this invention. The atom ratio of VIII/(VIII+VIB) in the catalyst is in the range of 0.2-0.8. The catalyst of this invention is especially suitable for one-stage once-through mild hydrocracking of heavy oil boiling above 350° C. The tail oil boiling above 350° C. is a high-quality feedstock for steam cracking.

24 Claims, No Drawings

MILD HYDROCRACKING CATLYST AND THE PROCESS THEREFOR

This is a continuation of copending application Ser. No. 07/670,050 filed on Mar. 15, 1991 and now abandoned.

This invention relates to a mild hydrocracking catalyst, the process therefor, and the application therewith.

BACKGROUND OF THE INVENTION

Mild hydrocracking is a hydrocracking process for converting heavy oil fraction to light products, controlled a conversion level within the range of 20–50% for the fraction boiling above 350° C. (or above 370° C.). The typical technological parameters are as follows:

pressure, MPa: 3.5–10.4
space velocity, $hr^{-1}$: 0.3–1.0
$H_2$/oil volume ratio, $Nm^3/m^3$: 300–1000
temperature, °C.: 360–430

Comparing with high pressure hydrocracking, mild hydrocracking shows advantages in lower investment and operating cost, lower operating pressure, and especially lower (50%) hydrogen consumption. Currently, the mild hydrocracking technology is mostly used for increasing the yield of middle distillates (132°–350° C. fraction), while its tail oil (>350° or 370° C. fraction) is used as the feedstock for FCC or as fuel oil, occasionally, is also used as the feedstock for steam cracking. Several European refineries have revamped their high pressure hydrocracking units for mild hydrocracking operation to provide feedstocks for steam cracking. The HC-K catalyst and the HC-16 hydrocracking catalyst are used in FPP process, developed by Union/Lummos in the United states. U.S. Pat. Nos. 4,738,767, 4,689,314, 4,600,703, and 4,396,500 disclose processes for preparing mild hydrocracking catalysts by impregnating $\gamma$-$Al_2O_3$ or $SiO_2$-$Al_2O_3$ with the solution of Mo Ni-P or Mo-Si-P (Si stands for an organic silicon compound). Meanwhile, U.S. Pat. Nos. 4,600,498, 4,309,277, and 3,853,747 describe that the zeolites having weak acidity are used as acidic components in hydrocracking catalysts. Zeolite Y hydrothermally stabilized by Ni or Co is used for this purpose in U.S. Pat. No. 3,853,747. EP 0320247 describes the use of a hydrophobic zeolite (LZ-10) having a $SiO_2/Al_2O_3$ mole ratio of 3.5–4.0, surface area of 500–700 $m^2/g$, unit cell size of 24.25–24.35 Å, vapor adsorption capacity of less than 8% at 250° C. and vapor partial pressure 4.6 mmHg: the zeolite and amorphous $SiO_2$-$Al_2O_3$ are dispersed in $Al_2O_3$ matrix to form catalyst support, then the support is impregnated with a Mo-Ni-P solution or W-Ni solution to prepare mild hydrocracking catalyst. A catalyst company in France files a patent (CN 85103645) in China which discloses a hydrocracking catalyst for producing middle distillate using a zeolite having medium acidity, a $SiO_2$/$Al_2O_3$ mole ratio of 12–40, a crystallinity of, preferably, 60%, a corresponding surface area of 550 $m^2/g$, and 3–15% of its pore volume contributed by pores having a diameter in the range of 20–80 Å (pore diameter of rest pores is less than 20 Å, no pores has a diameter larger than 80 Å). The prior art mentioned above are mainly devoted to increase the production of middle distillates. However, the utilization of tail oil is not paid too much attention.

OBJECTS OF THE INVENTION

One purpose of this invention is to provide a mild hydrocracking catalyst having high activity, nitrogen resistant ability, selectivity, and stability at medium pressure.

Another purpose of this invention is to provide a mild hydrocracking catalyst, for producing a tail oil boiling above 350° C. having low BMCI value. Said tail oil is a high quality feedstock for steam cracking.

SUMMARY OF THE INVENTION

This invention relates to a mild hydrocracking catalyst, the process therefor, and the application therewith. The mild hydrocracking catalyst of this invention contains 10–60 percent by weight, preferably 20–50 percent by weight REUHP zeolite, 2–30 percent by weight, preferably 5–20 percent by weight, alumina support, 10–45 percent by weight, preferably 15–35 percent by weight (calculated based on the weight of oxides) of at least one metal compound selected from Group VIII and at least one metal compound selected from Group VIB as active hydrogenation component, 10–30 percent by weight binder (calculated based on the weight of $\gamma$-$Al_2O_3$), and 0–10 percent by weight, preferably 3–6 percent by weight phosphorus oxide as promoter. The atom ratio VIII/(VIII+VIB) is in the range of 0.2–0.8, preferably 0.3–0.6.

The zeolite REUHP used in this invention possesses following properties: $SiO_2/Al_2O_3$ mole ratio is 5–10, $Na_2O$ content is 0.1–0.15 percent by weight, unit cell size is 24.30–24.50 Å, vapor adsorption capacity at 25° C. and $P/P_0=0.1$ is 2–6 percent by weight, surface area is 500–750 $m^2/g$, $RE_2O_3$ content is 3–10 percent by weight. The alumina support has following properties: pore volume (ethanol) is 0.8–1.1 ml/g, surface area (BET) is 200–300 $m^2/g$, alumina trihydrate content (XRD) is 0–3 percent by weight, and 80–90% of its pore volume contributed by pores having diameter larger than 50 Å. Said binder is pseudo-boehmite dissolved by inorganic acid, preferably by nitric acid. The Group VIB metal selected is Mo or W, Group VIII metal selected is Co or Ni.

The process for preparing the catalyst of this invention starts with the sequential ammonium exchange and rare earth exchange of NaY zeolite to prepare REUHP zeolite. According to the desired catalyst composition, calculated amount of REUHP zeolite, alumina support, at least one Group VIB metal compound and at least one Group VIII metal compound (active hydrogenation component), and promoter are used as raw materials, and pseudo-boehmite dissolved by inorganic acid, preferably by nitric acid, is used as binder. The catalyst is prepared by kneading or impregnation. The electrolytic ammonium salt used for the ammonium exchange step is $(NH_4)_2 SO_4$, $NH_4NO_3$, or $NH_4Cl$, preferably $NH_4Cl$. The rare earth salt used for the rare earth exchange step is the chloride, nitrate, or sulfate, preferably chloride, of lanthanum-rich or cerium-rich mixed rare earth. Group VIB metal compound includes molybdenum oxide and ammonium metatungstate. Group VIII metal compound includes nickel nitrate, nickel chloride, nickel sulfate, and basic nickel carbonate. Said REUHP zeolite can also be prepared from a USY zeolite having a $Na_2O$ content less than 0.2 percent by weight and an unit cell size of 24.44–24.55 Å through rare earth cation exchange and calcination.

The catalyst of this invention is suitable for heavy oil mild hydrocracking, especially suitable for one stage once-through mild hydrocracking process without recycling the tail oil boiling above 350° C. which can be used as feedstocks for steam cracking or catalytic cracking.

DETAILED DESCRIPTION OF THE INVENTION

The mild hydrocracking catalyst of this invention contains a support prepared by dispersing an acidic zeolite in $\gamma$-$Al_2O_3$ matrix, a binder prepared by the dissolution of pseudo-boehmite with inorganic acid, and an active hydrogenation component incorporated into the support through kneading or impregnation, and also a promoter can be added if necessary. The hydrogenation activity of the catalyst is improved through adjusting the atom ratio of the metals in different groups (Group VIB and VIII).

The mild hydrocracking catalyst of this invention contains 10-60 percent by weight, preferably 20-50 percent by weight REUHP zeolite, 2-30 percent by weight, preferably 5-20 percent by weight alumina support, 10-45 percent by weight, preferably 15-35 percent by weight (on the basis of the weight of oxides) active hydrogenation component, in which at least one metal (compound) is selected from Group VIII and at least one metal (compound) is selected from Group VIB, 10-30 percent by weight binder (on the basis of the $\gamma$-$Al_2O_3$ weight), and 0-10 percent by weight, preferably 3-6 percent by weight phosphorus oxide promoter. The atom ratio of VIII/(VIII+VIB) is in the range of 0.2-0.8, preferably 0,3-0.6.

The REUHP zeolite used in the catalyst of this invention possesses following properties:

| | |
|---|---|
| $SiO_2/Al_2O_3$ mole ratio | 5-10 |
| $Na_2O$ content | 0.1-0.15 wt. % |
| unit cell size | 24.30-24.50Å |
| capacity of vapor adsorption at 25° C. ($P/P_0 = 0.1$, on the basis of weight) | 2-6% |
| surface area | 500-750 $m^2/g$ |
| $RE_2O_3$ content | 3-10 wt. % |

The alumina support used in the catalyst of this invention possesses following properties:

| | |
|---|---|
| pore volume (ethanol) | 0.8-1.1 ml/g |
| surface area (BET) | 200-300 m/g |
| content of alumina trihydrate (XRD) | 0-3 wt. % |
| pore volume of pores having diameter > 50Å (in percentage of total pore volume) | 80-95% |

The Group VIB metal compound used in the catalyst of this invention is the oxide of molybdenum or tungsten, and the Group VIII metal compound is the oxide of cobalt or nickel.

As described above, the REUHP zeolite used in this invention has a $SiO_2/Al_2O_3$ mole ratio of 5-10 and an unit cell size of 24.30-24.50 Å. Therefore, the zeolite possesses less acid sites and weaker acidity compared with that of USY zeolite. The acidity of the zeolite of this invention measured by IR is 0.4-0.8 mM/g. The probability for the secondary cracking of the primary cracking products through the adsorption on the nearby acid sites is hence decreased. The pores in the zeolite having diameters concentrated either in the range of <20 Å or around 200 Å, form dual-pore-distribution. The secondary pores and the macro pores formed by crystal partial collapse are favorable to the diffusion of large molecules having average carbon number of 20-40. The rapid diffusion of the primary cracking products out of zeolite pores also avoids the secondary cracking or overcracking.

The thermal and hydrothermal stability of zeolite mainly depends on the kind of cation incorporated by exchange and the framework $SiO_2/Al_2O_3$ ratio. The kind of cation incorporated by exchange has significant influence on the dealumination of zeolite and hence influences the $SiO_2/Al_2O_3$ ratio of zeolite, while the $SiO_2/Al_2O_3$ ratio of zeolite further relates to the acidity and distribution of acid strength of zeolite. The zeolite used in this invention has been exchanged with rare earth cation. The content of rare earth in zeolite is one of the key factors, which not only influences catalyst activity but also influences catalyst thermal stability. The zeolite used in the catalyst of this invention is in a weight percentage (on the basis of $RE_2O_3$) of preferably 4-8.

The support used for the catalyst of this invention is a mixture of above described REUHP zeolite and alumina. On the basis of the weight of catalyst, the content of REUHP zeolite is 10-60 percent by weight, preferably 20-50 percent by weight, while the content of alumina support is 2-30 percent by weight, preferably 5-20 percent by weight.

The atom ratio of metals from different groups (Group VIB and VIII) used as hydrogenation component in a mild hydrocracking catalyst affects the hydrogenation activity of the catalyst. The adjustment and the optimization of the atom ratio of different metals for the catalytic hydrogenation reaction has been rarely reported in literature. Moreover, the conclusions made by the existing literature are quite discrepant. J. P. Frank and J. F. Lepage (Proc. 7th Inter. Congr. Catalysis, 1981) find that when the atom ratio VIII/(VIII+VIB) eauals to 0.25 the catalyst displays the best activity for toluene hydrocracking. Laine et al. (J. Chem. Tech Biotechnol., 29, 1979) and Ahuja (Ind. Eng. Chem. Prod. Res. Div., 9,3,1970) indicate that the best atom ratio for Ni/(Ni+Mo) is 0.3. M. I. Vazoze et al. (The canadian Journal of Chemical Engineering, 64,2,1986) conclude that 0.5 is the best atom ratio for Ni/(Ni+Mo). The characterization of the catalyst surface of this invention is performed by magnetic balance, position annihilation spectroscopy for chemical analysis (PASCA), and electron spectroscopy for chemical analysis (ESCA). The results demonstrate that when $WO_3$ content is in the range of 20-22 percent by weight, the maximum part of W can be dispersed on the surface of $WO_3$-$\gamma$-$Al_2O_3$ catalyst in the form of mono-molecular layer. Two series of catalysts, i.e., NiO-$WO_3$/$\gamma$-$Al_2O_3$ and NiO-$WO_3$/($\gamma$-$Al_2O_3$+USY) are evaluated for their hydrogenation activity on a micro reactor-GC system using cyclohexene as model compound. The results show that the highest cyclohexane yield is attained for NiO-$WO_3$/$\gamma$-$Al_2O_3$ series when the Ni/(Ni+W) atom ratio is 0.35-0.40 and for NiO-$WO_3$/($Al_2O_3$+USY) series the Ni/(Ni+W) atom ratio for achieving the same purpose is 0.4-0.45. The measurement of magnetic susceptibility of the catalyst and the ratio of signal intensity of different components in ESCA also verify the results of cyclohexene reaction. The NiO-$WO_3$-REUHP-$Al_2O_3$ catalysts having different Ni/(Ni+W)

atom ratios are also evaluated on a continuous flow micro reactor for their hydrogenation activity for toluene. The results indicated that the catalyst having a Ni/(Ni+W) atom ratio around 0.5 displays the highest relative hydrogenation activity for toluene conversion. Therefore, in the catalyst of this invention, the total content of Group VIB and VIII metal compounds (on the basis of the weight of oxide) is in the range of 5–40 percent by weight, preferably 15–35 percent by weight, wherein the VIII/(VIII+VIB) atom ratio is 0.2–0.8, preferably 0.3–0.6. The Group VIB metal used in the catalyst is tungsten or molybdenum. The Group VIII metal used is nickel or cobalt. The active metal components mentioned above are preferably in chemical state of sulfide or oxide of W-Ni or Mo-Ni.

In the composition of the catalyst of this invention, when the Group VIII metal selected is Ni, the Group VIB metal selected is W, and the promoter used is phosphorus oxide, the contents of those active components are as follow:

|  | general, wt. % | preferable, wt. % |
| --- | --- | --- |
| $WO_3$ (or $MoO_3$) | 10–35 | 15–25 |
| NiO | 3–10 | 5–8 |
| $P_2O_5$ | 0–10 | 3–6 |

Similar to other hydrocracking catalysts, the catalyst of this invention should be pre-sulfurized before catalytic reaction. The pre-sulfurization can be effected by injecting $H_2S$, $CS_2$, or $CH_3$-S-$CH_3$ into the flowing hydrogen. The condition of sulfurization is same as that for other hydrocracking catalyst. During the reaction process, the concentration of $H_2S$ in the flowing hydrogen should be less than 500 ppm.

The catalyst of this invention is especially suitable for fixed-bed reactor. The catalyst can be packed in the lower part of the reactor or placed in the second reactor of a two reactors series. The heavy oil is undergone hydrodesulfurization, hydrodenitrogenation, and hydrodemetallization to produce a refined oil having 10–100 ppm, preferably 5–50 ppm nitrogen. If there is no need to separate $H_2S$ and $NH_3$ from the effluent, the refined oil accompanied with the gas is directly introduced into the reactor packed with MHC catalyst and mild hydrocracking reaction proceeds under certain operating condition.

The catalyst of this invention can be prepared by kneading method, comprises following steps:

a. ammonium-exchanging NaY zeolite at least one time with an electrolytic ammonium salt to reduce its $Na_2O$ content to less than 3 percent by weight and obtaining an $NH_4NaY$ zeolite, ion-exchanging the prepared $NH_4NaY$ zeolite at least one time with an electrolytic rare earth salt to obtain a $RENH_4NaY$ zeolite, and hydrothermally treating the prepared RENHNaY zeolite under a condition of 450°–650° C. and 0.5–5 bar (with a vapor partial pressure of at least 0.026 bar), and with a residence time at least 30 minutes;

b. ammonium-exchanging the zeolite obtained from step a) at least one time with an electrolytic ammonium salt to further reduce its $Na_2O$ content to less than 0.3 percent by weight, hydrothermally treating the zeolite obtained thereof once more at a temperature of 500°–750° C. and thus obtaining REUHP zeolite;

c. admixing the powders of REUHP zeolite and alumina gel (support) with Group VIII and VIB metal compounds (active hydrogenation components) and promoter homogeneously according to the desired catalyst composition in a mixer and kneading in a kneader;

d. adding a binder prepared by the dissolution of pseudo-boehmite with inorganic acid to the mixture obtained from step c), kneading in a kneader and milling the final mixture in a mill to obtain a paste-like product;

e. extruding said paste-like product through a die plate having diameter of 1.6–2.0 mm, pre-drying the resulted extrudate at 60°–80° C. for 6–12 hours, cutting the dried exturdate and further drying at 110°–130° C. for 12–24 hours, and followed by calcining at 450°–550° C. for 3–8 hours.

The catalyst of this invention can also be prepared by impregnation method, comprises following steps:

a. ammonium-exchanging NaY zeolite at least one time with an electrolytic ammonium salt to reduce its $Na_2O$ content to less than 3 percent by weight to obtain an $NH_4NaY$ zeolite, ion-exchanging the prepared $NH_4NaY$ zeolite at least one time with an electrolytic rare earth salt to obtain a $RENH_4NaY$ zeolite, and hydrothermally treating the prepared $RENH_4NaY$ zeolite under a condition of 450°–650° C. and 0.5–5 bar (with a vapor partial pressure of at least 0.026 bar), and with a residence time at least 30 minutes;

b. ammonium-exchanging the zeolite obtained from step a) at least one time with an electrolytic ammonium salt to further reduce its $Na_2O$ content to less than 0.3 percent by weight, hydrothermally treating the zeolite obtained thereof once more at a temperature of 500°–750° C. and thus obtaining REUHP zeolite;

c. according to the desired catalyst composition, admixing the powder of REUHP zeolite with alumina gel homogeneously followed by adding to it a binder prepared by the dissolution of pseudo-boehmite with inorganic acid and kneading and milling the final mixture, extruding, pre-drying at 60°–80° C. for 6–12 hours cutting, drying at 110°–130° C. for 12–24 hours, and calcining at 450°–550° C. in dry air for 3–8 hours;

d. impregnating the support obtained from step c) saturately with an aqueous solution of Group VIB and VIII metal compounds and promoter, to produce a catalyst with desired contents of Group VIB and VIII metals and promoter, pre-drying at 60°–80° C. for 6–12 hours, drying at 110°–130° C. for 12–24 hours, calcining at 450°–550° C. for 3–8 hours.

According to the process of this invention, the NaY zeolite used for preparing REUHP zeolite has a $SiO_2$/$Al_2O_3$ mole ratio of 4–6, an unit cell size of 24.60–24.70 Å, a crystallinity of 87–100%, a surface area of 750–950 $m^2$/g, and a $Na_2O$ content of 9–11 percent by weight. The electrolytic ammonium salt used is $(NH_4)_2SO_4$, $NH_4NO_3$, and $NH_4Cl$, preferably $NH_4C$. The electrolytic rare earth salt used is lanthanum-rich or cerium-rich mixed rare earth sulfate, nitrate, or chloride, preferably chloride.

According to the process of this invention, the Group VIII metal compound includes nickel nitrate, nickel chloride, nickel sulfate, and basic nickel carbonate, the Group VIB metal compound includes molybdenum oxide and ammonium metatungstate.

According to the process of this invention, in the procedure for preparing REUHP zeolite, the $NH_4NaY$ zeolite obtained after the first ammonium-exchange has a $Na_2O$ content of preferably 2.6–2.8 percent by weight, the final REUHP zeolite has a $Na_2O$ content of preferably less than or equal to 0.15 percent by weight, or in the range of 0.10–0.15 percent by weight.

The REUHP zeolite used in this invention can also be prepared from a USY zeolite having an unit cell size of 24.44–24.55 Å through rare earth cation exchange and calcination. The detailed procedure is that said USY zeolite is exchanged with 2–4 percent by weight aqueous solution of $RECl_3$, $RE_2(SO_4)_3$, or $RE(NO_3)_3$ under a condition of 90°–100° C. and PH 3–5 for 0.5–2 hours, followed by filtrating, washing until no $Cl^-$ (or acid radical) being detectable in the filter liquor, drying at 100°–120° C., calcining at 450°–550° C. for 3–6 hours, then exchanging the resulted product with rare earth cation for the second time under a condition similar to that for the first time, washing by acid and water sequentially, drying, finally obtaining REUHP zeolite.

The catalyst of this invention is especially suitable for one stage once-through mild hydrocracking process without recycle the tail oil boiling above 350° C., which can be used as the feedstock for steam cracking to produce ethylene, propylene, and butadiene or as the feedstock for catalytic cracking to improve the yield and the quality of the light products. The typical operating condition is as follows:

| operating parameter | general | preferable |
|---|---|---|
| pressure, MPa | 3.5–18.00 | 5.5–9.81 |
| $H_2$ purity, % | >70 | >80 |
| temperature, °C. | 300–440 | 360–420 |
| LHSV, $h^{-1}$ | 0.3–3.0 | 1.0–2.5 |
| $H_2$/oil, $Nm^3/m^3$ | 300–1500 | 500–1000 |

Under the condition described above, the reaction proceeds to attain a certain conversion depth, and the conversion level of the fraction boiling above 350° C. is controlled within the range of 20–50 percent by weight, preferably 25–40 percent by weight.

Said heavy oil includes the oils from the lateral stream 4 of atmospheric tower and from the lateral stream 1, 2, and 3 of vacuum tower and the blends thereof, deasphalted shale oil, FCC cycle oil, and coal tar. The typical heavy oils are the blend of the oils from the first and second lateral stream of vacuum tower, the oil from the second lateral stream of vacuum tower, or the blend of the oils from the first and second lateral stream of vacuum tower mixed with small amount of the oil from third lateral stream of vacuum tower or coker heavy oil. By using the method of ASTM-D 1160, the feedstock shows a 50 percent by volume distillation temperature of higher than or equal to 400° C., a dry point less than 580° C. (preferably less than 550° C.), Conradson carbon less than 0.2%, and nitrogen content in the range of 0.0025–0.15%.

Since the hydrophobic zeolite REUHP having weak acidity and dual pore distribution and the $\gamma$-$Al_2O_3$ having proper pore diameter are used in the catalyst of this invention, the non-noble metal mild hydrocracking catalyst having optimized atom ratio of metals of this invention shows following advantages: high activity, better nitrogen resistant ability comparing with that of USY zeolite based catalyst under the same reaction condition, good selectivity for middle distillate ring-opening reaction of multi-ring aromatics and multi-ring alkanes can take place at medium pressure (7.84 MPa), especially, the tail oil boiling above 350° C. being rich in paraffin and having a BMCI value lower than that of feedstock by 10 units or more, and hence becoming attractive feedstock for ethylene production.

The invention is further illustrated by the following examples which are not intended as limiting the scope of the invention.

EXAMPLE 1

The preparation of catalyst A 300 g USY zeolite manufactured by the catalyst plant was exchanged with 31 of 3% aqueous solution of $RECl_3$ under a condition of 90°–95° C. and pH 3.5–4.0 for 1 hour. After filtrating, washing until no $Cl^-$ being detectable in filter liquor, drying at 110°±10° C., calcining at 500°±10° C. for 4 hours, the resulted zeolite was exchanged with 31 of 3% aqueous solution of $RECl_3$ once more under same condition described above. The product thus obtained was further washed by 0.01N HCl and water sequentially followed by drying to obtain REUHP zeolite having a $RE_2O_3$ content of 6.51 percent by weight, an unit cell size of 24.49 Å, and a $Na_2O$ content of less than 0.1 percent by weight.

107.3 g ammonium metatungstate $(NH_4)_2W_4O_{13}.8$-$H_2O$, 101.6 g nickel nitrate $Ni(NO_3)_2.6H_2O$, 133.8 g REUHP zeolite, and 125.7 g alumina powder were mixed together in a kneader and kneaded homogeneously, 400 g pseudo-boehmite dissolved by nitric acid was added to the mixture as a binder and the final mixture was kneaded again for 20–30 minutes and milled for 5–10 minutes in a mill to form a paste like material. The material was extruded through a 1.8 mm diameter die plate. After pre-drying at ambient temperature, cutting to the desired length, drying at 110°±10° C. for 8 hours, and calcining at 500°±10° C. for 4 hours, the catalyst was then obtained.

The catalyst contained 20.24 percent by weight $WO_3$, 6.09 percent by weight NiO, 30 percent by weight REUHP, and balancing content of alumina.

EXAMPLE 2

The preparation of reference catalyst B

USY zeolite (same as in Example 1) was used to replace REUHP zeolite. The preparation method is same as that in Example 1. USY zeolite used had an unit cell size of 24.51 Å and a $Na_2O$ content of less than 0.15 percent by weight. The catalyst prepared thereof contained 21.38 percent by weight $WO_3$, 6.24 percent by weight NiO, 30 percent by weight USY, and balancing content of alumina.

EXAMPLE 3

The preparation of catalyst C 500 g commercial NaY zeolite powder ($SiO_2$/$Al_2O_3$=5.0–5.2, $Na_2O$ content=9%, unit cell size=24.63–24.65 Å, relative crystallinity=94–102%) was exchanged with 51 of 10% aqueous solution of $NH_4NO_3$ at 90°–95° C. for 1 hour. The zeolite obtained thereof was exchanged again with 2.5.1 of 2.7% aqueous solution of $RECl_3$ under the condition of ambient temperature and pH 3.5 for 1 hour. After washing by water until no $Cl^-$ being detectable and drying, the zeolite was hydrothermally treated for 2 hours under a condition of 0.098 MPa and 550° C. The zeolite obtained thereof was exchanged once more with 10% aqueous solution of $NH_4NO_3$ to reduce its $Na_2O$ content to less than 0.15%. After washing and drying, the zeolite was hydrothermally treated again under a condition of 0.098 MPa and 600° C. The product REUHP zeolite had a $RE_2O_3$ content of 6.78 percent by weight and an unit cell size of 24.42 Å. 402.4 g $(NH_4)_2W_4O_{13}\cdot 8H_2O$, 414 g $Ni(NO_3)_2\cdot 6H_2O$, 627 g REUHP zeolite, and 165 g alumina gel were mixed and kneaded together homogeneously in a kneader. 85.4 g 85% $H_3PO_4$ and 1400 g binder (pseudo-boehmite dissolved by nitric acid) were added to the mixture, then milled in a mill for 20-30 minutes and extruded through a die plate having diameter of 1.8 mm. After pre-drying at 50°-60° C., cutting to the desired length, drying at 110°±10° C., and calcining at 500±10° C., the catalyst C was thus obtained. The catalyst C contained 21.58 percent by weight $WO_3$, 6.78 percent by weight NiO, and 2.92 percent by weight $P_2O_5$.

EXAMPLE 4

The preparation of reference catalyst D

The USY zeolite used in Example 1 was replaced by UHP zeolite. To prepare UHP zeolite, NaY was exchanged with ammonium cation to obtain an NH NaY zeolite followed by hydrothermal treatment of $NH_4NaY$ at 650° C. The zeolite obtained was further dealuminated by 0.1N HCl treatment and hydrothermal treatment at 650° C., followed by ammonium exchange to reduce its $Na_2O$ content to 0.2 percent by weight. The zeolite obtained thereof had a unit cell size of 23.30 Å. The catalyst D was prepared according to the method described in Example 1. Catalyst D contained 21.88 percent by weight $WO_3$ and 5.97 percent by weight NiO.

The properties of REUHP zeolite of this invention are listed in Table 1.

TABLE 1

| REUHP | The properties of REUHP zeolite | | |
|---|---|---|---|
| | First calcination | Second calcination | Starting NaY |
| Pore volume, ml/g | 0.37 | 0.375 | 0.259 |
| Surface area, m²/g | 883 | 653 | 969 |
| Average pore Diameter, Å | 8.4 | 11.5 | 5.3 |
| Pore distribution, % | | | |
| 20Å | 80.4 | 67.2 | |
| 20-50Å | 2.6 | 5.2 | |
| 50-100Å | 2.6 | 2.5 | |
| 100-200Å | 3.4 | 7.4 | |
| >200Å | 8.7 | 16.8 | |
| $SiO_2/Al_2O_3$ | 5.7 | 7.2 | 5.16 |
| Unit cell size, Å | 24.53 | 24.42 | 24.64 |
| Relative crystallinity, % | 80 | 67 | >97 |

EXAMPLE 5

Catalyst activity evaluation tests

The activities of catalyst C and reference catalysts B and D were evaluated on a 200 ml pilot hydrogenation reactor using Shengli VGO as feedstock having properties shown in Table 2. The evaluation condition was as follows: hydrogen partial pressure-6.37 MPa, $H_2$/oil -1000, nitrogen content in refined feedstock -30-40 ppm, space velocity-2.0/hour. The results of the evaluation tests were listed in Table 3.

TABLE 2

| The properties of Shengli VGO | |
|---|---|
| Gravity, $d_4^{20}$ | 0.8750 |
| Distillation range, °C. | |
| initial | 296 |
| 10% | 362 |
| 50% | 435 |
| 90% | 504 |
| dry point | 541 |
| Hydrocarbon composition, % | |
| paraffin | 43.0 |
| naphthene | 32.7 |
| aromatic | 24.3 |
| resin, % | 4.05 |
| Conradson carbon, % | 0.11 |
| BMCI | 28.6 |

TABLE 3

| Catalyst | Initial activity of catalysts | | |
|---|---|---|---|
| | Zeolite type | Reaction temp., °C. | Yield of 320° C. fraction |
| B (ref.) | USY | 380 | 33.4 |
| C (This inv.) | REUHP | 375 | 37.1 |
| D (Ref.) | UHP | 385 | 37.5 |

It can be seen from Table 3 that the activity of catalyst C of this invention is superior to that of catalyst B and D.

EXAMPLE 6

Catalyst stability tests

The stability evaluation tests for catalyst A and C (this invention) and catalyst B (reference) were performed on the same reactor and with the same feedstock and operating condition as described in Example 5.

The results of these tests are listed in Table 4.

TABLE 4

| Catalyst stability test | | | |
|---|---|---|---|
| Catalyst A (REUHP zeolite) | | | |
| Time on stream, h. | 160-288 | 312-1072 | 1664-2864 |
| Reaction temperature, °C. | 380 | 380 | 385 |
| Yield of <320° C. fraction % | 38.0 | 38.8 | 33.2 |
| Catalyst B (USY zeolite) | | | |
| Time on stream, h | 160-240 | 256-368 | 384-496 |
| Reaction temperature, °C. | 378 | 380 | 385 |
| Yield of <320° C. fraction % | 32.4 | 33.7 | 22.1 |
| Catalyst C (REUHP zeolite) | | | |
| Time on stream, h | 160-896 | 1392-2192 | |
| Reaction temperature, °C. | 375 | 380 | |
| Yield of <320° C. fraction % | 35.3 | 34.3 | |

It can be seen from Table 4 that the stability of catalyst A and C of this invention is superior to that of reference catalyst B.

EXAMPLE 7

The effectiveness of the catalyst of this invention in application

Catalyst A of this invention was used in the mild hydrocracking process with Shengli VGO as feedstock. The properties of the product are compared with that of feedstock. The results were shown in Table 5.

TABLE 5

| Process | Properties of the product from the mild hydrocracked Shengli VGO | | |
|---|---|---|---|
| | VGO-MHC | VGO-MHC | VGO |
| Conversion of >350° C. fraction, % | 31.3 | 44.5 | 0 |
| Product distribution, % | | | |
| <130° C. | 3.5 | 8.7 | |
| 130-180° C. | 5.0 | 8.1 | |
| 180-350° C. | 23.4 | 27.4 | |

TABLE 5-continued

Properties of the product from the mild hydrocracked Shengli VGO

| Process | VGO-MHC | VGO-MHC | VGO |
|---|---|---|---|
| Product properties | | | |
| Naphtha (65-130° C.) | | | |
| Potential aromatics, % | 49 | 53.7 | |
| Nitrogen, mg/ml | <1 | — | |
| Gasoline (<180° C.) | | | |
| MONC | — | 62.0 | |
| Diesel oil (180-350° C.) | | | |
| Pour point, °C. | −10 | −12 | |
| C.N. | 43 | 48 | |
| Tail oil (>350° C.) | | | |
| Conradson carbon, % | 0.01 | 0.007 | 0.05 |
| Hydrogen, % | 14.02 | 14.28 | 13.29 |
| BMCI | 14.19 | 12.61 | 27.68 |

As shown in Table 5, the properties of VGO-MHC products are much better than that of VGO.

Using MHC-VGO and VGO as feedstocks, steam cracking were performed and coke deposition was checked. The results were listed in Table 6.

TABLE 6

Steam cracking of MHC-VGO and VGO and coke deposition test

| | MHC-VGO | MHC-VGO | VGO |
|---|---|---|---|
| Conversion of >350° C. fraction, % | 31.3 | 44.5 | 0 |
| Main cracking products, wt. % | | | |
| $C_2H_6$ | 3.71 | 3.70 | 3.4 |
| $C_2H_4$ | 26.51 | 27.41 | 20.49 |
| $C_3H_6$ | 17.18 | 17.49 | 13.96 |
| $1,3-C_4H_6$ | 6.31 | 6.60 | 4.8 |
| $C_4$ | 70.50 | 71.95 | 58.31 |
| $C_5-204°$ C. | 22.85 | 23.35 | 29.61 |
| 204-288° C. | 1.38 | 2.49 | 2.16 |
| >288° C. fuel oil | 5.27 | 2.21 | 9.91 |
| benzene | 3.75 | 4.41 | 4.9 |
| toluene | 2.29 | 2.45 | 4.26 |
| xylene, etc. | 1.74 | 1.60 | 3.36 |
| coke, ppm (on the basis of feedback) | — | 1.12 | 72.08 |

It can be seen from Table 6, comparing with the steam cracking of VGO under same operating conditions, the steam cracking of MHC-VGO increases the ethylene yield by 6-7%, the $C_2-C_4$ olefin yield by 10-12%, and decreases the fuel oil (>288° C.) yield by 4.7-7.7%, and decreases the coke yield to a very low level. Obviously MHC-VGO is a high-quality feedstock for steam cracking.

EXAMPLE 8

The catalytic cracking tests of MHC-VGO and VGO.

MHC-VGO and VGO were tested as feedstocks on a pilot riser FCC unit using a double-calcined REY based catalyst. The operating condition and product yield distribution are listed in Table 7.

TABLE 7

MHC-VGO and VGO catalytic cracking test

| | MHC-VGO | VGO |
|---|---|---|
| Operating condition | | |
| Reaction temperature, °C. | 500 | 500 |
| Regeneration temperature, °C. | 660 | 660 |
| Cat./oil | 7.5 | 8.0 |
| Product yield, wt. % | | |
| Cracking gas | 16.65 | 9.45 |
| Gasoline ($C_5$-200° C.) | 60.10 | 43.08 |
| Light gas oil (200-350° C.) | 8.31 | 15.85 |

TABLE 7-continued

MHC-VGO and VGO catalytic cracking test

| | MHC-VGO | VGO |
|---|---|---|
| Heavy oil (>350° C.) | 12.98 | 27.03 |
| Coke | 1.01 | 2.68 |
| Loss | 1.05 | 1.91 |
| Conversion, wt. % | 78.71 | 57.12 |
| Gasoline plus diesel oil, wt. % | 68.09 | 58.93 |

As shown in Table 7, when the tail oil boiling above 350° C. obtained from VGO mild hydrocracking is used as a feedstock for FCC, the conversion level is increased by 21.59 percent by weight, coke yield is reduced by 1.67 percent by weight, and the yield of gasoline plus diesel oil is increased by 9 percent by weight, comparing with the case of VGO being used as feedstock. In addition, product quality is also improved, such as, the lower sulfur content in gasoline (10 ppm vs. 1712 ppm), the higher cetane number of diesel oil (43 vs. 35), the better diesel oil stability, the higher propene and butene yield, and the less $C_1-C_2$ yield.

In summary, the catalyst of this invention has the characteristics in high selectivity, and high stability at medium pressure. Because of the low BMCI value of the tail oil, it is especially favorable to the application of the tail oil boiling above 350° C. obtained from the mild hydrocracking process using the catalyst of this invention as a feedstock for steam cracking.

What we claimed is:

1. A mild hydrocracking catalyst, comprising 2-3 percent by weight alumina as support, 10-60 percent by weight REUHP zeolite dispersed in said support, and further admixed therewith 10-45 percent by weight (on the basis of oxides) metal compounds as active hydrogenation components in which at least one metal compound is non-noble metal selected from Group VIII and at least one metal compound is selected from Group VIB with the atom ratio of said metal compounds VII/(VIII+VIB) in the range of 0.2-0.8, 10-30 percent by weight binder (on the basis of $\gamma$-$Al_2O_3$), and 0-10 percent by weight phosphorus oxide as promoter.

2. The catalyst according to claim 1, wherein said REUHP zeolite possesses following properties:

| | |
|---|---|
| $SiO_2/Al_2O_3$ (mole ratio) | 5-10 |
| $Na_2O$ content | 0.1-0.15 wt. % |
| Unit cell size | 24.30-24.50 Å |
| Capacity of vapor adsorption at 25° C.($P/P_0$ = 0.1, on the basis of weight) | 2-6% |
| Surface area | 500-750 m²/g |
| $RE_2O_3$ content | 3-10 wt. %. |

3. The catalyst according to claim 1, wherein said Group VIB metal is Mo or W, and said Group VIII metal is Co or Ni.

4. The catalyst according to claim 1, wherein said Group VIB metal compounds conclude the oxides of tungsten and molybdenum, and said Group VIII metal compound conclude the oxides of nickel and cobalt.

5. The catalyst according to claim 1, wherein said alumina support possesses following properties:

| | |
|---|---|
| pore volume (ethanol) | 0.8-1.1 ml/g |
| surface area (BET) | 200-300 m²/g |
| Content of alumina trihydrate (XRD) | 0-3 wt. % |
| The pore volume of pores having diameter > 50Å (in | 80-95%. |

-continued percentage of total pore volume)

6. The catalyst according to claim 1, wherein said binder is pseudo-boehmite dissolved by inorganic acid.

7. The catalyst according to claim 6, wherein said inorganic acid is nitric acid 8. A catalyst according to claim 1, wherein said catalyst contains 20-50 percent by weight REUHP zeolite and 5-20 percent by weight active hydrogenation components, 3-6 percent by weight phosphorus oxide promoter, and 10-30 percent by weight binder (on the basis of $\gamma$-Al$_2$O$_3$), the VIII/(VIII+VIB) atom ratio is in the range of 0.3-0.6.

9. A process for preparing mild hydrocracking catalyst, comprising following steps:
   a. ammonium-exchanging NaY zeolite at least one time with an electrolytic ammonium salt to reduce its Na$_2$O content to less than 3 percent by weight to obtain an NH$_4$NaY zeolite, ion-exchanging the prepared NH$_4$NaY zeolite at least one time with an electrolytic rare earth salt to obtain a RENH$_4$NaY zeolite, and hydrothermally treating the prepared RENH$_4$NaY zeolite under a condition of 450°-650° C. and 0.5-5 bar (with a vapor partial pressure of at least 0.026 bar), and with a residence time of at least 30 minutes;
   b. ammonium-exchanging the zeolite obtained from step a) at least one time with an electrolytic ammonium salt to further reduce its Na$_2$O content to less than 0.3 percent by weight, hydrothermally treating the zeolite obtained once more at a temperature of 500°-750° C. and thus obtaining REUHP zeolite;
   c. admixing the powders of REUHP zeolite and alumina gel (support) with Group VIII and VIB metal compounds (active hydrogenation components) and promoter homogeneously according to the desired catalyst composition in a mixer and then kneading in a kneader,
   d. adding a binder prepared by the dissolution of pseudo-boehmite with inorganic acid to the mixture obtained from step c), kneading in a kneader and milling the final mixture in a mill to obtain a paste-like product;
   e. extruding said paste-like product through a die plate having diameter of 1.6-2.0 mm, pre-drying the resulted extrudate at 60°-80° C. for 6-12 hours, cutting the dried extrudate and further drying at 110°-130° C. for 12-24 hours, and followed by calcining at 450°-550° C. for 3-8 hours.

10. The process according to claim 9, wherein said NaY has a SiO$_2$/Al$_2$O$_3$ mole ratio of 4-6, an unit cell size of 24.60-24.70 Å, a crystallinity of 87-100%, a surface area of 750-950 m$^2$/g, and a Na$_2$O content of 9-11 percent by weight.

11. The process according to claim 9, wherein said ammonium salt is (NH$_4$)$_2$SO$_4$, NH$_4$Cl, or NH$_4$NO$_3$.

12. The process according to claim 9, wherein said electrolytic rare earth salt is lanthanum-rich or cerium-rich mixed rare earth sulfate, nitrate, or chloride.

13. The process according to claim 12, wherein said rare earth salt is lanthanum-rich or cerium-rich mixed rare earth chloride.

14. The process according to claim 9, wherein said REUHP zeolite is prepared from a USY zeolite having a Na$_2$O content of less than 0.2 percent by weight and a unit cell size of 24.44-24.55 Å through rare earth cation exchange and calcination.

15. The process according to claim 9, wherein said Group VIII metal compounds include nickel nitrate, nickel chloride, nickel sulfate, and basic nickel carbonate, said Group VIB metal compounds include molybdenum oxide and ammonium metatungstate.

16. The process according to claim 9, wherein said NH$_4$NaY zeolite has a Na$_2$O content of 2.6-2.8 percent by weight and said REUHP zeolite has a Na$_2$O content of less than or equal to 0.15 percent by weight.

17. A process for preparing mild hydrocracking catalyst, comprising following steps:
   a. ammonium-exchanging NaY zeolite at least one time with an electrolytic ammonium salt to reduce its Na$_2$O content to less than 3 percent by weight to obtain a NH$_4$NaY zeolite, ion-exchanging the prepared NH$_4$NaY zeolite at least one time with an electrolytic rare earth salt to obtain a RENH$_4$NaY zeolite, and hydrothermally treating the prepared RENH$_4$NaY zeolite under a condition of 450°-650° C. and 0.5-5 bar (with a vapor partial pressure of at least 0.026 bar), and with a residence time at least 30 minutes;
   b. ammonium-exchanging the zeolite obtained from step a) at least one time with an electrolytic ammonium salt to further reduce its Na$_2$O content to less than 0.3 percent by weight, hydrothermally treating the zeolite obtained once more at a temperature of 500°-750° C. and thus obtaining REUHP zeolite;
   c. according to the desired catalyst composition, admixing the powder of REUHP zeolite with that of alumina gel homogeneously, followed by adding to it a binder prepared by the dissolution of pseudo-boehmite with inorganic acid and kneading and milling the final mixture, extruding, pre-drying at 60°-80° C. for 6-12 hours, cutting, drying at 110°-130° C. for 12-24 hours, and calcining at 450°-550° C. in dry air for 3-8 hours;
   d. impregnating the support obtained from step c) saturately with an aqueous solution of Group VIII and VIB metal compounds and promoter to produce a catalyst having desired contents of Group VIB and VIII metals and promoter, pre-drying at 60°-80° C. for 6-12 hours, drying at 110°-130° C. for 12-24 hours, calcining at 450°-550° C. for 3-8 hours.

18. The process according to claim 17, wherein said NaY has a SiO$_2$/Al$_2$O$_3$ mole ratio of 4-6, an unit cell size of 24.60-24.70 Å, a crystallinity of 87-100%, a surface area of 750-950 m$^2$/g, and a Na$_2$O content of 9-11 percent by weight.

19. The process according to claim 17, wherein said ammonium salt is (NH$_4$)$_2$SO$_4$, NH$_4$Cl, or NH$_4$NO$_3$.

20. The process according to claim 17, wherein said electrolytic rare earth salt is lanthanum-rich or cerium-rich mixed rare earth sulfate, nitrate, or chloride.

21. The process according to claim 20, wherein said rare earth salt is lanthanum-rich or cerium-rich mixed rare earth chloride.

22. The process according to claim 17, wherein said REUHP zeolite is prepared from a USY zeolite having a Na$_2$O content of less than 0.2 percent by weight and a unit cell size of 24.44-24.55 Å through rare earth cation exchange and calcination.

23. The process according to claim 17, wherein said Group VIII metal compounds include nickel nitrate, nickel chloride, nickel sulfate, and basic nickel carbonate, said Group VIB metal compounds include molybdenum oxide and ammonium metatungstate.

24. The process according to claim 17, wherein said NH$_4$NaY zeolite has a Na$_2$O content of 2.6-2.8 percent by weight and said REUHP zeolite has a Na$_2$O content of less than or equal to 0.15 percent by weight.

* * * * *